(12) United States Patent
Shin et al.

(10) Patent No.: US 12,033,100 B2
(45) Date of Patent: Jul. 9, 2024

(54) PREDICTION DEVICE, PREDICTION METHOD, AND NON-TRANSITORY COMPUTER READABLE MEDIUM

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Hiromasa Shin, Yokohama (JP); Yoshiaki Shiga, Kawasaki (JP); Ryoichi Ichikawa, Fuchu (JP); Ichiro Toyoshima, Toshima (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/567,604

(22) Filed: Sep. 11, 2019

(65) Prior Publication Data

US 2020/0293967 A1 Sep. 17, 2020

(30) Foreign Application Priority Data

Mar. 12, 2019 (JP) ................................. 2019-045043

(51) Int. Cl.
*G06Q 10/00* (2023.01)
*G06N 20/00* (2019.01)
(Continued)

(52) U.S. Cl.
CPC ....... *G06Q 10/06314* (2013.01); *G06N 20/00* (2019.01); *G06Q 10/04* (2013.01); *G06Q 10/109* (2013.01)

(58) Field of Classification Search
CPC ............... G06Q 30/02; G06Q 30/0202; G06Q 10/0639; G06Q 10/105; G06Q 10/04;
(Continued)

(56) References Cited

U.S. PATENT DOCUMENTS

2014/0052421 A1* 2/2014 Allen ...................... G05B 17/02
703/2
2019/0138913 A1 5/2019 Kakimoto et al.
(Continued)

FOREIGN PATENT DOCUMENTS

JP 2005076552 A * 3/2005 ............. C08G 77/24
JP 3650304 B2 5/2005
(Continued)

OTHER PUBLICATIONS

Ryo Satoh, et al., "Daily Load Curve Forecasting with Corrective Mechanism by Multi-Layered Neural Network," IEEJ Transactions Power and Energy, vol. 114-B, No. 10, 1994, 26 pages (with English machine translation).

*Primary Examiner* — Matheus Ribeiro Stivaletti
(74) *Attorney, Agent, or Firm* — Oblon, McClelland, Maier & Neustadt, L.L.P.

(57) ABSTRACT

According to one embodiment, a prediction device includes: first processing circuitry and second processing circuitry. The first processing circuitry corrects a demand result value on a particular date on a basis of an adjustment coefficient depending on the particular date; and generates a prediction model of a demand on a basis of the corrected demand result value on the particular date and a demand result value on a non-particular date. The second processing circuitry calculates a demand predicted value on a date of a prediction target on a basis of demand result values on one or more dates, an adjustment coefficient depending on a particular date among the one or more dates, and the prediction model. The second processing circuitry inversely corrects the
(Continued)

demand predicted value using an adjustment coefficient depending on the date of the prediction target if the date of the prediction target is a particular date.

9 Claims, 14 Drawing Sheets

(51) Int. Cl.
  *G06Q 10/04* (2023.01)
  *G06Q 10/0631* (2023.01)
  *G06Q 10/109* (2023.01)

(58) Field of Classification Search
  CPC ......... G06Q 10/063; G06Q 10/063114; G06Q 10/06316; G06Q 10/0635; G06Q 10/06393; G06Q 10/06398; G06Q 10/067; G06Q 10/087; G06Q 20/203; G06Q 30/06; G06Q 30/0633; G06Q 40/00; G06Q 40/04; G06Q 40/06; G06Q 40/08
  See application file for complete search history.

(56) References Cited

U.S. PATENT DOCUMENTS

| | | | |
|---|---|---|---|
| 2019/0148944 A1 | 5/2019 | Shiga et al. | |
| 2019/0155267 A1 | 5/2019 | Shin et al. | |
| 2019/0370832 A1* | 12/2019 | Utsumi | G06Q 10/04 |
| 2020/0006946 A1* | 1/2020 | Fife | G06Q 10/0639 |
| 2020/0074570 A1* | 3/2020 | Yu | G06K 9/6256 |
| 2020/0210920 A1* | 7/2020 | Joseph | G06N 20/00 |
| 2020/0286105 A1* | 9/2020 | Joseph | G06N 20/00 |

FOREIGN PATENT DOCUMENTS

| | | | | |
|---|---|---|---|---|
| JP | 2014035759 A | * | 2/2014 | |
| JP | 2017-175845 A | | 9/2017 | |
| JP | 2019-87030 A | | 6/2019 | |
| JP | 2019-91367 A | | 6/2019 | |
| JP | 2019-92323 A | | 6/2019 | |
| KR | 101575735 B1 | * | 12/2015 | G06Q 50/06 |

* cited by examiner

DEMAND RESULT DB

| DATE | TIME | ELECTRIC POWER SUPPLY RESULT [TEN THOUSAND kW] |
|---|---|---|
| ... | ... | ... |
| 2015/05/01 | 00:00~01:00 | 2,577 |
| 2015/05/01 | 01:00~02:00 | 2,450 |
| 2015/05/01 | 2:00~03:00 | 2,429 |
| 2015/05/01 | 3:00~04:00 | 2,450 |
| 2015/05/01 | 4:00~05:00 | 2,482 |
| 2015/05/01 | 5:00~06:00 | 2,577 |
| 2015/05/01 | 6:00~07:00 | 2,849 |
| 2015/05/01 | 7:00~08:00 | 3,181 |
| 2015/05/01 | 8:00~09:00 | 3,512 |
| 2015/05/01 | 9:00~10:00 | 3,736 |
| 2015/05/01 | 10:00~11:00 | 3,771 |
| 2015/05/01 | 11:00~12:00 | 3,746 |
| ... | ... | ... |

FIG. 2

CALENDAR DB (EXAMPLE 1)

| THE NUMBER OF ELAPSED DAYS WITHIN YEAR | DATE | DAY | HOLIDAY FLAG |
|---|---|---|---|
| . . . | . . . | . . . | . . . |
| 121 | 2015/05/01 | FRIDAY | F |
| 122 | 2015/05/02 | SATURDAY | T |
| 123 | 2015/05/03 | SUNDAY | T |
| 124 | 2015/05/04 | MONDAY | T |
| 125 | 2015/05/05 | TUESDAY | T |
| 126 | 2015/05/06 | WEDNESDAY | T |
| 127 | 2015/05/07 | THURSDAY | F |
| 127 | 2015/05/08 | FRIDAY | F |
| 128 | 2015/05/09 | SATURDAY | T |
| 129 | 2015/05/10 | SUNDAY | T |
| 130 | 2015/05/11 | MONDAY | F |
| 131 | 2015/05/12 | TUESDAY | F |
| . . . | . . . | . . . | . . . |

FIG. 3

CALENDAR DB (EXAMPLE 2)

| THE NUMBER OF ELAPSED DAYS WITHIN YEAR | DATE | DAY | PARTICULAR DATE FLAG |
|---|---|---|---|
| . . . | . . . | . . . | . . . |
| 121 | 2015/05/01 | FRIDAY | F |
| 122 | 2015/05/02 | SATURDAY | F |
| 123 | 2015/05/03 | SUNDAY | F |
| 124 | 2015/05/04 | MONDAY | T |
| 125 | 2015/05/05 | TUESDAY | T |
| 126 | 2015/05/06 | WEDNESDAY | T |
| 127 | 2015/05/07 | THURSDAY | F |
| 127 | 2015/05/08 | FRIDAY | F |
| 128 | 2015/05/09 | SATURDAY | F |
| 129 | 2015/05/10 | SUNDAY | F |
| 130 | 2015/05/11 | MONDAY | F |
| 131 | 2015/05/12 | TUESDAY | F |
| . . . | . . . | . . . | . . . |

FIG. 4

WEATHER PREDICTION DB

| DATE | TIME | TEMPERATURE [°C] | SOLAR RADIATION INTENSITY [MJ/m²] | WIND SPEED [m/s] | PRECIPITATION AMOUNT [mm] |
|---|---|---|---|---|---|
| ... | ... | ... | ... | ... | ... |
| 2015/05/01 | 0:00 | 16.2 | 0.0 | 3.4 | 0.0 |
| 2015/05/01 | 1:00 | 16.9 | 0.0 | 3.5 | 0.5 |
| 2015/05/01 | 2:00 | 16.3 | 0.0 | 2.9 | 1.5 |
| 2015/05/01 | 3:00 | 16.1 | 0.0 | 3.9 | 2.0 |
| 2015/05/01 | 4:00 | 16.0 | 0.0 | 3.9 | 1.2 |
| 2015/05/01 | 5:00 | 16.0 | 0.0 | 4.9 | 1.0 |
| 2015/05/01 | 6:00 | 17.1 | 0.00 | 4.1 | 2.5 |
| 2015/05/01 | 7:00 | 17.3 | 0.18 | 4.8 | 1.5 |
| 2015/05/01 | 8:00 | 18.5 | 0.46 | 5.4 | 3.5 |
| 2015/05/01 | 9:00 | 18.9 | 0.71 | 5.8 | 2.0 |
| 2015/05/01 | 10:00 | 19.5 | 0.95 | 4.6 | 2.0 |
| 2015/05/01 | 11:00 | 20.7 | 1.06 | 6.0 | 1.0 |
| ... | ... | ... | ... | ... | ... |

FIG. 5

ADJUSTMENT COEFFICIENT DB

| THE NUMBER OF ELAPSED DAYS WITHIN YEAR | TIME | ADJUSTMENT COEFFICIENT |
|---|---|---|
| . . . | . . . | |
| 80 | 22:00 ~23:00 | 0.67 |
| 80 | 23:00 ~24:00 | 0.69 |
| 119 | 00:00 ~01:00 | 0.75 |
| 119 | 01:00 ~02:00 | 0.79 |
| ... | ... | 0.76 |
| 119 | 23:00 ~24:00 | 0.70 |
| 123 | 00:00 ~01:00 | 0..68 |
| 123 | 01:00 ~02:00 | 0.66 |
| ... | ... | ... |
| 123 | 23:00 ~24:00 | 0.61 |
| 124 | 00:00 ~01:00 | 0.81 |
| 124 | 01:00 ~02:00 | 0.75 |
| 124 | 02:00 ~03:00 | 0.76 |
| 124 | 03:00 ~04:00 | 0.77 |
| 124 | 04:00 ~05:00 | 0.81 |
| . . . | | . . . |

FIG. 6

| DATE | TIME | ELECTRIC POWER SUPPLY RESULT [TEN THOUSAND kW] |
|---|---|---|
| ... | ... | ... |
| 2015/05/03 | 21:00~22:00 | 2,477 |
| 2015/05/03 | 22:00~23:00 | 2,350 |
| 2015/05/03 | 23:00~24:00 | 2,329 |
| 2015/05/04 | 00:00~01:00 | 2,550 |
| 2015/05/04 | 01:00~02:00 | 2,582 |
| 2015/05/04 | 02:00~03:00 | 2,677 |
| 2015/05/04 | 04:00~05:00 | 2,749 |
| 2015/05/04 | 7:00~08:00 | 3,081 |
| 2015/05/04 | 8:00~09:00 | 3,412 |
| 2015/05/04 | 9:00~10:00 | 3,636 |
| 2015/05/04 | 10:00~11:00 | 3,871 |
| 2015/05/04 | 11:00~12:00 | 3,946 |
| ... | ... | ... |

Rows for 2015/05/03 (NON-PARTICULAR DATE): OUTPUT DEMAND RESULT VALUE AS IS

Rows for 2015/05/04 (PARTICULAR DATE): ADJUST DEMAND RESULT VALUE BY DIVIDING DEMAND RESULT VALUE BY ADJUSTMENT COEFFICIENT CORRESPONDING TO EACH TIME

FIG. 9

MODEL PARAMETER DB

| TIME | PARAMETER |
|---|---|
| 00:00~01:00 | $\theta_0 \equiv \alpha_{1\_0}, \cdots, \alpha_{A\_0}, \beta_{1\_0}, \cdots, \beta_{B\_0}, \gamma_{0\_0}, \cdots, \gamma_{C\_0}, \delta_{p\_0}, \cdots, \delta_{p+D\_0}$ |
| 01:00~02:00 | $\theta_1 \equiv \alpha_{1\_1}, \cdots, \alpha_{A\_1}, \beta_{1\_1}, \cdots, \beta_{B\_1}, \gamma_{0\_1}, \cdots, \gamma_{C\_1}, \delta_{p\_1}, \cdots, \delta_{p+D\_1}$ |
| 02:00~03:00 | $\theta_2 \equiv \alpha_{1\_2}, \cdots, \alpha_{A\_2}, \beta_{1\_2}, \cdots, \beta_{B\_2}, \gamma_{0\_2}, \cdots, \gamma_{C\_2}, \delta_{p\_2}, \cdots, \delta_{p+D\_2}$ |
| 03:00~04:00 | $\theta_3 \equiv \alpha_{1\_3}, \cdots, \alpha_{A\_3}, \beta_{1\_3}, \cdots, \beta_{B\_3}, \gamma_{0\_3}, \cdots, \gamma_{C\_3}, \delta_{p\_3}, \cdots, \delta_{p+D\_3}$ |
| 04:00~05:00 | $\theta_4 \equiv \alpha_{1\_4}, \cdots, \alpha_{A\_4}, \beta_{1\_4}, \cdots, \beta_{B\_4}, \gamma_{0\_4}, \cdots, \gamma_{C\_4}, \delta_{p\_4}, \cdots, \delta_{p+D\_4}$ |
| 05:00~06:00 | $\theta_5 \equiv \alpha_{1\_5}, \cdots, \alpha_{A\_5}, \beta_{1\_5}, \cdots, \beta_{B\_5}, \gamma_{0\_5}, \cdots, \gamma_{C\_5}, \delta_{p\_5}, \cdots, \delta_{p+D\_5}$ |
| 06:00~07:00 | $\theta_6 \equiv \alpha_{1\_6}, \cdots, \alpha_{A\_6}, \beta_{1\_6}, \cdots, \beta_{B\_6}, \gamma_{0\_6}, \cdots, \gamma_{C\_6}, \delta_{p\_6}, \cdots, \delta_{p+D\_6}$ |
| 07:00~08:00 | $\theta_7 \equiv \alpha_{1\_7}, \cdots, \alpha_{A\_7}, \beta_{1\_7}, \cdots, \beta_{B\_7}, \gamma_{0\_7}, \cdots, \gamma_{C\_7}, \delta_{p\_7}, \cdots, \delta_{p+D\_7}$ |
| 08:00~09:00 | $\theta_8 \equiv \alpha_{1\_8}, \cdots, \alpha_{A\_8}, \beta_{1\_8}, \cdots, \beta_{B\_8}, \gamma_{0\_8}, \cdots, \gamma_{C\_8}, \delta_{p\_8}, \cdots, \delta_{p+D\_8}$ |
| 09:00~10:00 | $\theta_9 \equiv \alpha_{1\_9}, \cdots, \alpha_{A\_9}, \beta_{1\_9}, \cdots, \beta_{B\_9}, \gamma_{0\_9}, \cdots, \gamma_{C\_9}, \delta_{p\_9}, \cdots, \delta_{p+D\_9}$ |
| 10:00~11:00 | $\theta_{10} \equiv \alpha_{1\_10}, \cdots, \alpha_{A\_10}, \beta_{1\_10}, \cdots, \beta_{B\_10}, \gamma_{0\_10}, \cdots, \gamma_{C\_10}, \delta_{p\_10}, \cdots, \delta_{p+D\_10}$ |
| ... | ... |
| 23:00~24:00 | $\theta_{23} \equiv \alpha_{1\_23}, \cdots, \alpha_{A\_23}, \beta_{1\_23}, \cdots, \beta_{B\_23}, \gamma_{0\_23}, \cdots, \gamma_{C\_23}, \delta_{p\_23}, \cdots, \delta_{p+D\_23}$ |

FIG. 11

| DATE OF PREDICTION TARGET | TIME | PREDICTED ELECTRIC POWER SUPPLY AMOUNT [TEN THOUSAND kW] |
|---|---|---|
| 2015/12/23 | 00:00~01:00 | 11.21 |
| 2015/12/23 | 01:00~02:00 | 12.02 |
| 2015/12/23 | 2:00~03:00 | 10.81 |
| 2015/12/23 | 3:00~04:00 | 9.99 |
| 2015/12/23 | 4:00~05:00 | 9.54 |
| 2015/12/23 | 5:00~06:00 | 8.88 |
| 2015/12/23 | 6:00~07:00 | 8.55 |
| 2015/12/23 | 7:00~08:00 | 9.15 |
| 2015/12/23 | 8:00~09:00 | 9.45 |
| 2015/12/23 | 9:00~10:00 | 9.99 |
| 2015/12/23 | 10:00~11:00 | 10.71 |
| 2015/12/23 | 11:00~12:00 | 10.95 |
| ... | ... | ... |

FIG. 12

PREDICTION DEVICE, PREDICTION METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2019-045043, filed on Mar. 12, 2019, the entire contents of which are incorporated herein by reference.

FIELD

The present disclosure relates to a prediction device, a prediction method, and a non-transitory computer readable medium.

BACKGROUND

A prediction method of a demand using machine learning is widely used because a demand in the future can be predicted from a demand in the past with high accuracy. With this prediction method, while high prediction accuracy can be achieved for a date which matches a frequent pattern appeared in past data (such as, for example, a normal weekday and a normal weekend), prediction accuracy is lowered for a date which matches a rare pattern (such as, for example, a holiday and long consecutive holidays of year-end and New Year holidays). Such a date will be referred to as a "particular date". That is, with the above-described prediction method, prediction accuracy for a demand on a particular date is low. Practically, prediction accuracy of a demand on a particular date is important. Therefore, it is required to improve prediction accuracy of a demand on a particular date.

BRIEF DESCRIPTION OF THE DRAWINGS

FIG. 2 is a diagram illustrating an example of demand result data stored in a demand result DB;

FIG. 3 is a diagram illustrating an example of calendar information stored in a calendar DB;

FIG. 4 is a diagram illustrating another example of the calendar information stored in the calendar DB;

FIG. 5 is a diagram illustrating an example of weather prediction data stored in a weather prediction DB;

FIG. 6 is a diagram illustrating an example of adjustment coefficient data stored in an adjustment coefficient DB;

FIG. 9 is a diagram schematically illustrating an aspect where a demand result value on a particular date is corrected;

FIG. 11 is a diagram illustrating an example of parameters stored in a parameter DB;

FIG. 12 is a diagram illustrating an example of a demand predicted value stored in a demand prediction DB;

DETAILED DESCRIPTION

According to one embodiment, a prediction device includes: first processing circuitry and second processing circuitry. The first processing circuitry corrects a demand result value on a particular date on a basis of an adjustment coefficient depending on the particular date; and generates a prediction model of a demand on a basis of the corrected demand result value on the particular date and a demand result value on a non-particular date. The second processing circuitry calculates a demand predicted value on a date of a prediction target on a basis of demand result values on one or more dates, an adjustment coefficient depending on a particular date among the one or more dates, and the prediction model. The second processing circuitry inversely corrects the demand predicted value using an adjustment coefficient depending on the date of the prediction target if the date of the prediction target is a particular date.

Below, embodiments will be described below with reference to the drawings.

Figure 1:
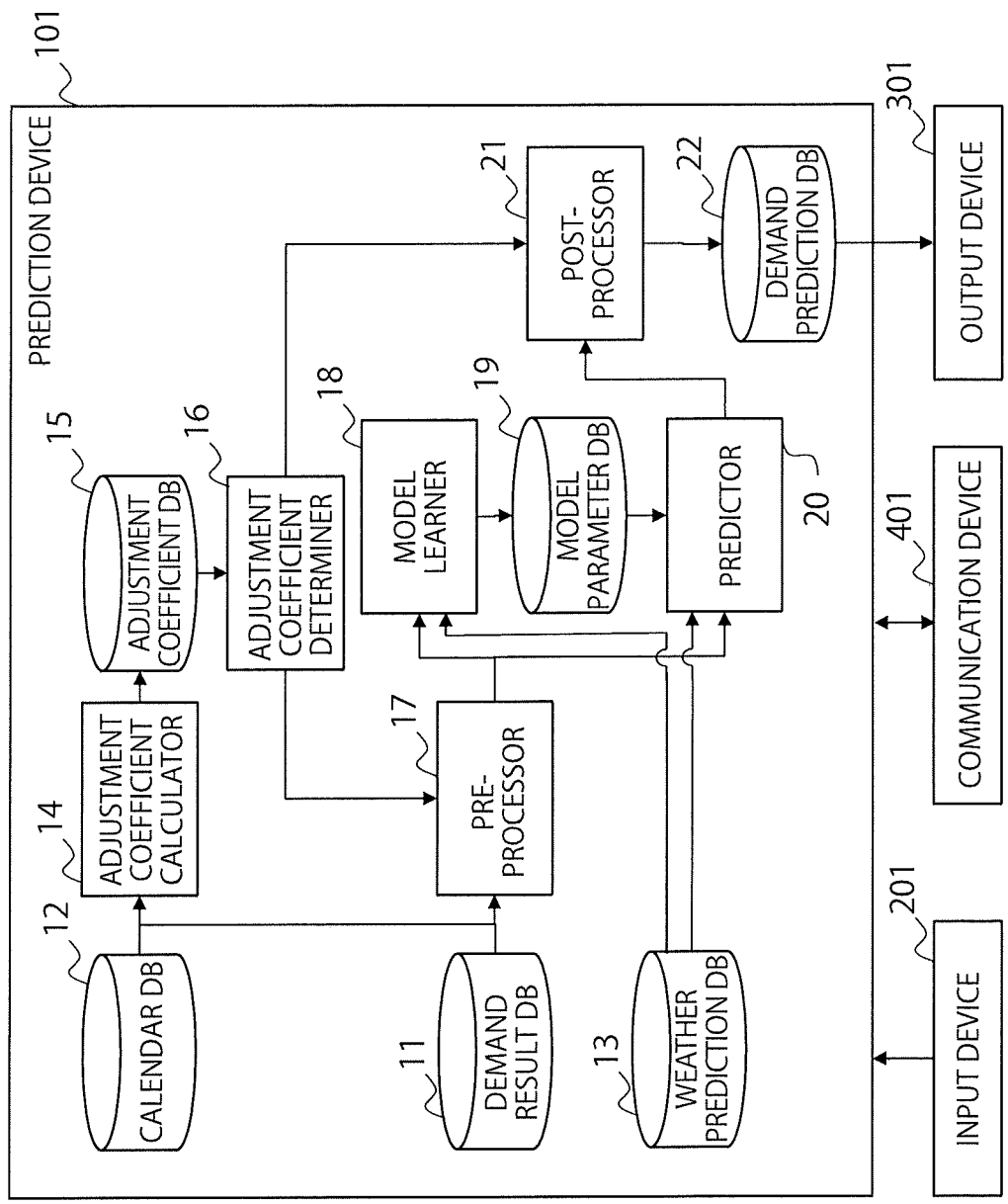
FIG. 1 is a diagram illustrating an overall configuration example of a prediction system according to an embodiment.

FIG. 1 illustrates an overall configuration example of a prediction system according to an embodiment. The prediction system in FIG. 1 includes a prediction device 101, an input device 201, an output device 301 and a communication device 401.

The input device 201 is connected to the prediction device 101 via a communication network or a communication cable. The communication network is a wired network, a wireless network or a hybrid of these networks as an example. The communication cable is an arbitrary cable such as a USB cable and a serial cable as an example. The input device 201 receives various kinds of instructions or operation relating to data input from a user of the present device. The user is an operator, a manager, or the like, of the present device. The input device 201 accepts operation relating to processing of the prediction device 101, operation relating to visualization of a prediction result of the prediction device 101, or the like, from the user. The input device 201 is realized with, for example, a mouse, a keyboard, a touch panel, a track ball, a joystick, a pen tablet, a speech recognition device, an image recognition device or combination of these. The input device 201 may be an information terminal such as a personal computer, a tablet, a smartphone and a mobile phone.

The output device 301 is a device which outputs data input from the prediction device 101. The output device 301 is connected to the prediction device 101 via a communication network or a communication cable. The communication network is a wired network, a wireless network or a hybrid of these as an example. The communication cable is an arbitrary cable such as a USB cable and a serial cable as an example. The output device 301 is a display device which can display data as an example. In this case, the output device 301 may be, for example, a liquid crystal display, an organic electroluminescence display, an LED (Light Emitting Diode) display, a CRT (Cathode Ray Tube) display, a projector or other types of displays. The output device 301 may be a printer which prints data on a sheet. In the following description, a case will be described where the output device 301 is a display device.

The communication device 401 can perform communication with a server, a terminal, or the like, via a communication network. The communication network is a wired network, a wireless network or a hybrid of these. The communication network is a local area network or a wide area network as an example. The prediction device 101 can perform communication with a server, a terminal, or the like, by using the communication device 401. The user may remotely operate the prediction device 101 via the communication device 401 using a terminal.

The input device 201, the communication device 401 and the output device 301 may be integrally configured using a personal computer, a tablet, a smartphone, or the like. Furthermore, at least one of the input device 201, the communication device 401 and the output device 301 may be configured integrally with the prediction device 101.

The prediction device 101 includes a demand result database (DB) 11, a calendar DB 12, a weather prediction DB 13, an adjustment coefficient calculator 14, an adjustment coefficient DB 15, an adjustment coefficient determiner 16, a pre-processor 17, a model learner 18, a model parameter DB 19, a predictor 20, a post-processor 21 and a demand prediction DB 22. The elements shown in FIG. 1 may be configured by circuitry. For example, the adjustment coefficient calculator 14, the adjustment coefficient determiner 16, the pre-processor 17 and the model learner 18 may be configured by first processing circuitry, and the predictor 20 and post-processor 21 may be configured by second processing circuitry. The first processing circuitry and the second processing circuitry may be physically same hardware or may be different hardware. Other hardware configuration may be also possible.

The demand result database (DB) 11 holds result data of a demand (demand result data) in a target area of demand prediction. The result data may be called actual data. In the demand result data, a result value of a demand (demand result value) is associated with time information. The demand in the present embodiment is an electric power supply amount in a supply area of an electric power company. However, the demand may be other demands such as an amount of water used, an amount of gas used, the number of incoming calls to a call center, sales price of a product, the number of sales, shipment, output and the number of visitors to a facility.

FIG. 2 illustrates an example of the demand result data stored in the demand result DB 11. The demand result data is stored in a table form. Columns of a date (year-month-date), time and a result value of an electric power supply amount (demand result value) are indicated. For example, the result value of electric power supply from 0:00 to 1:00 on May 1, 2015 is 25.77 million kW. While the demand result value is stored for each time frame of one hour obtained by dividing one day into 24 time frames, the demand result value may be stored in other unit of time such as in unit of 30 minutes obtained by dividing one day into 48 time frames.

The demand result DB 11 may be constructed by the user inputting data using the input device 201. At this time, a recording medium such as a memory may be connected to the prediction device 101, and the demand result data may be stored in the demand result DB 11 from the recording medium. Alternatively, the prediction device 101 may transmit an acquisition request for the demand result data to an external demand result management server (not illustrated) via the communication device 401 and acquire the demand result data from the demand result management server. The acquisition request may include information designating an area corresponding to an acquisition target. In this case, demand result data in the designated area is acquired.

The calendar DB 12 in FIG. 1 holds calendar information on one year or a plurality of years.

FIG. 3 illustrates an example of calendar information stored in the calendar DB 12. The calendar information is stored in a table form. An example of the calendar information in 2015 is indicated. The calendar information before 2014 may be stored. The calendar information includes the number of elapsed days in the year, a date (year-month-date), a day and a holiday flag.

The number of elapsed days in the year indicates the number of elapsed days in the case where January 1 is set as the first day of the year. For example, on January 31, the number of elapsed days is 31 days, on February 28, the number of elapsed days is 59 (=31+28) days, and, on May 1, the number of elapsed days is 121 (=31+28+31+30+1) days. A column of the number of elapsed days in the year may be not provided.

The holiday flag indicates whether or not the date is a holiday. In a case of a holiday, "T" is stored, and in a case of a date which is not a holiday, "F" is stored. In the present embodiment, Saturday and Sunday are defined as holidays. Furthermore, public holidays (including substitute holidays of public holidays) are also defined as holidays. Furthermore, dates determined by custom, regulations, or the like, (in a case of Japan, January 2, January 3, or the like) may be also defined as holidays. In the example in the drawing, because May 3, 4, 5 and 6 in 2015 are respectively Japanese holidays, holiday flags of "T" are set. Because May 2, 3, 9 and 10 in 2015 are Saturday or Sunday, holiday flags of "T" are set. Note that May 3 is Sunday and is also a holiday. Because May 1, 7, 8, 11 and 12 in 2015 are normal weekdays, "F" is set. Weekdays are Monday, Tuesday, Wednesday, Thursday and Friday. Normal weekdays are weekdays which are not holidays.

Items in the calendar information are not limited to the example in FIG. 3. For example, a column of name of holidays may be provided in the calendar DB 12. For example, May 3 is Constitution Memorial Day, May 4 is Greenery Day, May 5 is Children's Day, and May 6 is a substitute holiday (in a case of Japan).

FIG. 4 illustrates another example of the calendar information stored in the calendar DB 12. The calendar information includes the number of elapsed days in the year, a date (year-month-date), a day, and a particular date flag. Items other than the particular date flag are the same as those in FIG. 3.

The particular date flag is a flag which identifies a particular date. The particular date is a special date which is different from dates frequently appearing in calendar. Examples of the dates frequently appearing can include normal weekdays and weekends. The weekends are Saturday or Sunday. Holidays and dates determined by regulations, or the like, appear, for example, only once a year, and correspond to the particular dates. While, in the case where a weekend overlap with a holiday, the date may be set as the particular date while priority is given to a fact that the date is the holiday; however, in the present embodiment, the date is dealt with as the weekend. Whether the date is the particular date can be arbitrarily defined by the user, and the particular date may be set using criteria other than those described here. For example, in the case where the date is a holiday by custom in a number of business institutions within a target area of demand prediction, the date may be set as the particular date. Dates other than the particular dates (for example, normal weekdays and weekends) may be referred to as non-particular dates.

The particular date flag may be set by a user who is an operator, a manager, or the like, of the present device using the input device 201. Alternatively, the present device may extract dates which satisfy a condition from the calendar information and may automatically set the particular date flags for the extracted dates. For example, holidays other than weekends may be extracted from calendar, and particular date flags may be set for the extracted dates.

The weather prediction DB 13 holds weather prediction data in a target area of demand prediction. The weather prediction data includes predicted values (weather predicted values) of meteorological values and time information (date and time).

FIG. 5 illustrates an example of the weather prediction data stored in the weather prediction DB 13. The weather prediction data is stored in a table form. A date, time and weather predicted values are stored. In this example, while the weather predicted values are a temperature, solar irradiance, wind speed, and a precipitation amount in this example, the weather predicted values are not limited to those described here. For example, the weather predicted values may be a direction of wind, sunshine duration, or the like. While the weather predicted values are stored in unit of one hour obtained by dividing one day into 24 time frames here, the weather predicted values may be stored in other unit of time such as in unit of 30 minutes obtained by dividing one day into 48 time frames.

The weather prediction DB 13 may be constructed by the user inputting data using the input device 201. At this time, a recording medium such as a memory may be connected to the prediction device 101, and the weather prediction data may be stored in the weather prediction DB 13 from the recording medium. Alternatively, the prediction device 101 may transmit an acquisition request for the weather prediction data to an external weather prediction server (not illustrated) via the communication device 401 and acquire the weather prediction data from the weather prediction server. The acquisition request may include information designating an area which becomes an acquisition target. In this case, the weather prediction data in the designated area is acquired.

The above-described weather prediction server is a server which predicts meteorological values (weather information) in the target area. The weather prediction server predicts the meteorological values on the basis of observation values of the meteorological values observed by one or more observation stations provided within the target area of the demand prediction. The weather prediction server may use a weather satellite for observing the meteorological values. The weather prediction server stores values of the predicted meteorological values (weather predicted values) in an internal database (DB) in association with time information (date and time). The weather prediction server is a weather information server, web service or cloud service provided by domestic and international government institutions such as the Meteorological Agency, private entities or international institutions, as an example.

It is also possible to provide a weather predictor which predicts meteorological values at the prediction device 101, and the weather predictor may predict the meteorological values on the basis of places of observation of the meteorological values and a numerical prediction model.

The adjustment coefficient calculator 14 specifies the particular date on the basis of the calendar DB 12, and specifies the number of elapsed days in the year corresponding to the particular date. The adjustment coefficient calculator 14 calculates an adjustment coefficient for the specified number of elapsed days in the year for each time. In the case where one hour obtained by dividing one day into 24 time frames is used as a unit time, an adjustment coefficient is calculated for each of time from 0:00 to 1:00, from 1:00 to 2:00, . . . , from 23:00 to 24:00.

In the case where the calendar information in the form illustrated in FIG. 4 is stored in the calendar DB 12, the adjustment coefficient calculator 14 detects a date for which the particular date flag is "T" as the particular date.

In the case where the calendar information stored in the calendar DB 12 is calendar information which does not have a particular date flag as illustrated in FIG. 3, the adjustment coefficient calculator 14 detects the particular date through particular date detection processing. Alternatively, the user designates the particular date using the input device 201. As an example of the particular date detection processing, there is a case where holidays other than weekends (Saturday and Sunday) are detected as particular dates. Alternatively, the particular date may be detected using other criteria. For example, in the case where Saturday or Sunday overlaps with a holiday, the date may be set as the particular date.

The adjustment coefficient calculator 14 performs the following processing for each time (hereinafter, referred to as time "s") on the detected particular date.

All normal weekdays are specified from within a first period immediately before the particular date, and all normal weekdays are specified from within a second period immediately after the particular date. For example, all normal weekdays are specified from respective ten days before and after the particular date. In this example, the number of days in the first period may be the same as or different from the number of days in the second period. Furthermore, the first period does not have to be immediately before the particular date if the first period is before the particular date. The second period does not have to be immediately after the particular date if the second period is after the particular date.

For example, in the case where the particular date is May 4 (Monday), ten days before that date are from April 24 to May 3, and ten days after that date are from May 5 to May 14. Normal weekdays from April 24 to May 3 are five days of April 24, 27, 28, 30 and May 1. Normal weekdays from May 5 to May 14 are six days of May 7, 8, 11, 12, 13 and 14. Therefore, normal weekdays are 11 days.

Demand result values at the same time s on the weekdays specified from periods before and after the particular date are specified from the demand result DB 11. A mean value of the specified demand result values is calculated. In the above-described example, demand result values at time s on April 24, 27, 28, 30 and May 1, 7, 8, 11, 12, 13 and 14 are specified from the demand result DB 11, and a mean value of the specified demand result values is calculated.

Specifically, if the demand result values at the time s on a date D are indicated as LOAD(s_D), a mean value (MEAN) of the demand result values at the time s on the date D is calculated with the following expression (1). There is a case where this mean value MEAN will be referred to as a weekday mean value.

$$\text{MEAN}(s) = \{\text{LOAD}(s\_0424) + \text{LOAD}(s\_0427) + \text{LOAD}(s\_0428) + \text{LOAD}(s\_0430) + \text{LOAD}(s\_0501) + \text{LOAD}(s\_0506) + \text{LOAD}(s\_0507) + \text{LOAD}(s\_0508) + \text{LOAD}(s\_0511) + \text{LOAD}(s\_0512) + \text{LOAD}(s\_0513) + \text{LOAD}(s\_0514)\}/11 \quad (1)$$

The adjustment coefficient calculator 14 specifies the demand result value at the time s on the particular date from the demand result DB 11. The adjustment coefficient calculator 14 divides the demand result value LOAD(s) at the time s on the particular date by the above-described mean value of the demand result values to thereby obtain an adjustment coefficient (demand ratio). The adjustment coefficient C is calculated with the following expression (2).

$$C(s)=LOAD(s)/MEAN(s) \qquad (2)$$

The adjustment coefficient calculator 14 associates the calculated adjustment coefficient at time s on the particular date with (1) the number of elapsed days in the year corresponding to the particular date and (2) the time s. This is set as adjustment coefficient data. The adjustment coefficient calculator 14 stores the adjustment coefficient data in the adjustment coefficient DB 15.

The adjustment coefficient DB 15 stores therein the adjustment coefficient data regarding each particular date, generated by the adjustment coefficient calculator 14.

FIG. 6 illustrates an example of the adjustment coefficient data stored in the adjustment coefficient DB 15. The number of elapsed days in the year, time and the adjustment coefficient are stored. The number of elapsed days in the year of 80 corresponds to a holiday on Mar. 21, 2015, the number of elapsed days in the year of 119 corresponds to Apr. 29, 2015, the number of elapsed days in the year of 123 corresponds to May 3, and the number of elapsed days in the year of 124 corresponds to May 4. These are all particular dates.

While, in the example in FIG. 6, the adjustment coefficient is associated with the number of elapsed days in the year and the time, the adjustment coefficient may be associated with the particular date and the time.

While the adjustment coefficient data in FIG. 6 is generated using calendar information in 2015, the adjustment coefficient data may be generated using calendar information on a plurality of years (for example from 2013 to 2015). In this case, a mean value of adjustment coefficients calculated for the time s on the same particular date of a plurality of years may be set as the adjustment coefficient at the time s on the particular date. It is also possible to use other statistics such as a median value, a maximum value and a minimum value in place of the mean value.

There is a case where a date of the particular date or the number of elapsed days in the year of the particular date is different depending on years even if name of the particular date is the same. For example, because the number of days in February is 29 in a leap year, while the number of elapsed days in the year on March 21 is 81 in a leap year, the number of elapsed days in the year on March 21 is 80 in other years. Therefore, in the case where calendar information on a plurality of years is used, the number of elapsed days in the year of the particular date in a basis year (for example, 2015) is determined and the determined number of elapsed days in the year is registered in the adjustment coefficient DB 15. With respect to other years (for example, 2014, 2013), in the case where name of the particular date is managed, it is only necessary to specify a date having the same name as the particular date in the basis year from the calendar information in 2014 and 2013. Alternatively, it is also possible to specify, from the calendar information in 2014 and 2013, the particular date for which the number of elapsed days in the year is the same as or the closest to that of the particular date.

Here, the demand result value LOAD, the weekday mean value MEAN and the ratio (demand ratio) of the demand result value LOAD with respect to the weekday mean value MEAN described above will be specifically described using FIG. 7 and FIG. 8.

Figure 7:
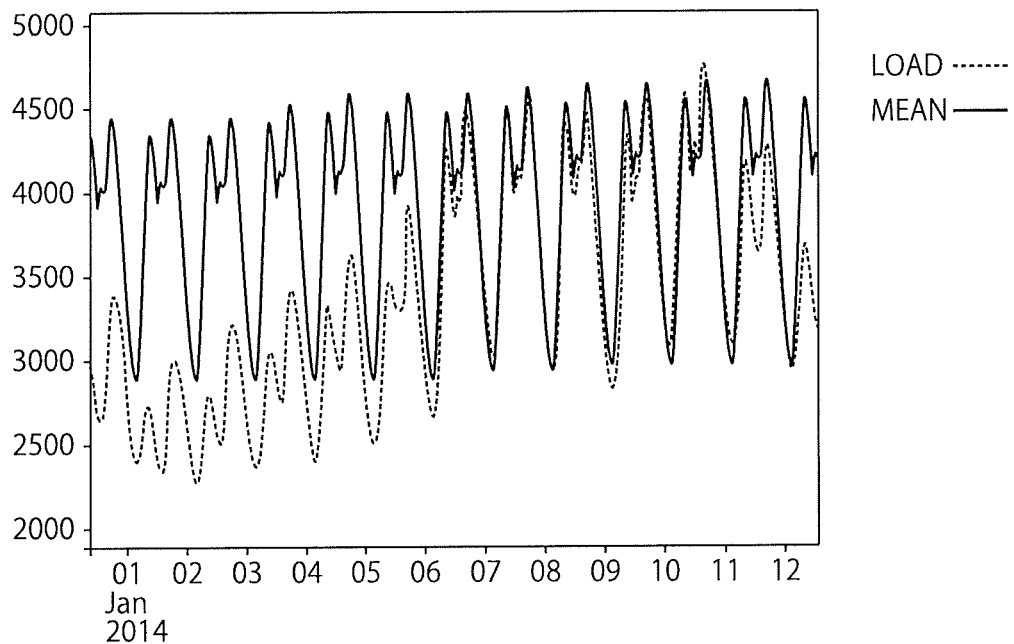
FIG. 7 is a diagram illustrating examples of a graph of a demand result value LOAD and a graph of a weekday mean value MEAN.

FIG. 7 illustrates an example where a graph of the demand result value LOAD and a graph of the weekday mean value MEAN are generated and visualized for a period from Jan. 1, 2014 to Jan. 12, 2014. The graph of the weekday mean value MEAN is generated using a mean value of weekdays of ten days before and after each of the dates. January 1 to 3 are New Year's holidays (particular dates), January 4 and 5 are weekends, and January 6 to January 10 are weekdays. There is an extremely small difference or little difference between the weekday demand result value LOAD and the weekday mean value MEAN. In contrast, the demand result values LOAD of the New Year's holidays decrease to approximately ⅔ of the weekday mean value MEAN.

Figure 8:
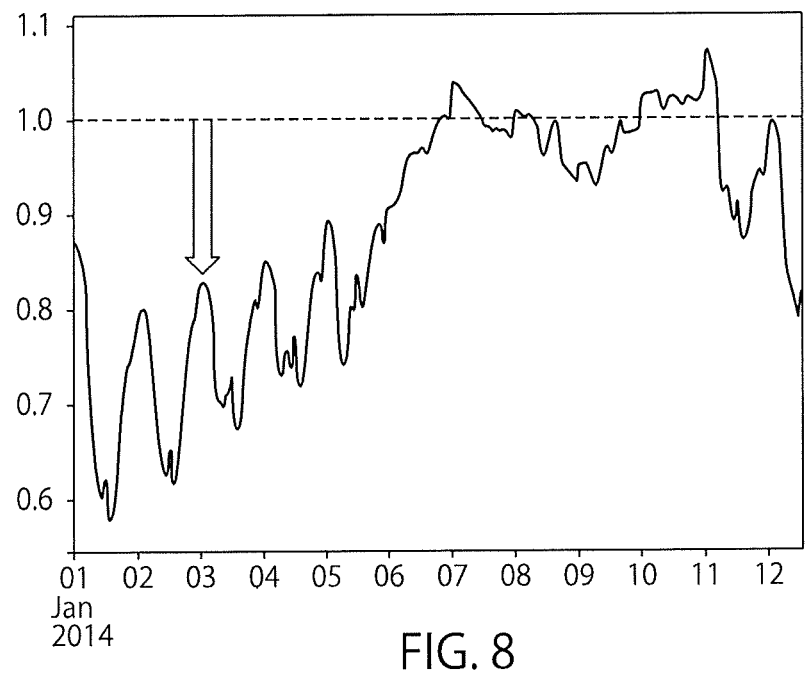
FIG. 8 is a diagram illustrating a graph of a ratio of the demand result value LOAD with respect to the weekday mean value MEAN.

FIG. 8 illustrates an example where a ratio (demand ratio) of the demand result value LOAD with respect to the weekday mean value MEAN illustrated in FIG. 7 is calculated and visualized using a graph. The demand ratio corresponds to the adjustment coefficient calculated using expression (2). It can be seen that while the demand ratio on weekdays is approximately 1.0 (see a dashed line in the drawing), the demand ratio on Saturday and Sunday decreases to 0.8 to 0.9, and the demand ratio on the New Year's holidays decreases to 0.6 to 0.8. Further, the demand ratio on Saturday and Sunday, and the New Year's holidays is higher during night-time than in daytime, that is, a degree of decrease of the demand is larger in daytime.

Learning Phase

The pre-processor 17 reads out demand result data to be used for learning of the demand prediction model from the demand result DB 11. A period of data to be used for learning can be arbitrarily determined. For example, data on past one year may be used for learning. The period may be designated by the user using the input device 201 or may be determined in advance.

The pre-processor 17 determines whether or not the date is the particular date for each date of the readout demand result data. The pre-processor 17 corrects the demand result on the particular date for each time (each time frame). The demand result value on the date which is not the particular date (non-particular date) is not corrected. Processing of correcting the demand result value in accordance with whether or not the date is the particular date in this manner will be referred to as pre-processing. The pre-processing will be described in detail below.

In order to correct the demand result value on a date and time t (t includes a date (year-month-date) and time) of the particular date, a function $g^{-1}$ is used. Here, a function g and the function $g^{-1}$ will be defined as follows. $y_t$ is a demand result value on the date and time t, and $R_t$ is an adjustment coefficient corresponding to the date and time t. The adjustment coefficient corresponding to the date and time t is an adjustment coefficient corresponding to the time t among adjustment coefficients corresponding to the number of elapsed days in the year of the date. Note that, because the demands on most of the particular dates tend to decrease compared to the demands on the weekdays, the adjustment coefficient is normally $0 < R_t < 1$ (< and > are inequality signs.)

[Expression 1]

$$g(y_t) = \begin{cases} y_t, & \ldots \text{date of date and time } t \text{ is not a particular date} \\ y_t R_t, & \ldots \text{date of date and time } t \text{ is not a particular date} \end{cases} \quad (3)$$

[Expression 2]

$$g^{-1}(y_t) = \begin{cases} y_t, & \ldots \text{date of date and time } t \text{ is not a particular date} \\ y_t/R_t, & \ldots \text{date of date and time } t \text{ is not a particular date} \end{cases} \quad (4)$$

The function g is set as follows: in the case where the date of the date and time t is not the particular date, the demand result value $y_t$ is output as is, and, in the case where the date of the date and time t is the particular date, a value of the demand result value $y_t$ of the date of the date and time t multiplied by the adjustment coefficient $R_t$ is output.

The function $g^{-1}$ is set as follows: in the case where the date of the date and time t is not the particular date, the demand result value $y_t$ is output as is, and, in the case where the date of the date and time t is the particular date, a value of the demand result value $y_t$ of the date and time t divided by the adjustment coefficient $R_t$ is output.

In the following description, division of the demand result value $y_t$ by the adjustment coefficient $R_t$ as the function $g^{-1}$ will be referred to as correction of the demand result value $y_t$ by the adjustment coefficient $R_t$. Multiplication of the demand result value $y_t$ by the adjustment coefficient $R_t$ as the function g will be referred to as inverse correction of the demand result value $y_t$ by the adjustment coefficient $R_t$.

The pre-processor 17 transmits an acquisition request for the adjustment coefficient corresponding to the date and time t to the adjustment coefficient determiner 16 in the case where the date of the date and time t is the particular date. The adjustment coefficient determiner 16 calculates the number of elapsed days of the date and time t in a year. Then, the adjustment coefficient determiner 16 specifies the number of elapsed days (target number of elapsed days) in the year closest to the calculated number of days in the adjustment coefficient DB 15 and acquires the adjustment coefficient corresponding to time of the date and time t of the target number of elapsed days from the adjustment coefficient DB 15.

For example, if the calculated number of days is set as Q1, in the case where the number of elapsed days which is the same as Q1 exists in the adjustment coefficient DB 15, the number of days becomes the target number of elapsed days. In the case where the number of elapsed days which is the same as Q1 does not exist, the number of elapsed days (set as Q2) closest after the number of days Q1 and the number of elapsed days (set as Q3) closest before the number of days Q1 are specified. An absolute value |Q1−Q2| of a difference between Q1 and Q2 is compared with an absolute value |Q1−Q3| of a difference between Q1 and Q3. In the case where |Q1−Q2| is smaller, Q2 is set as the target number of elapsed days. In the case where |Q1−Q3| is smaller, Q3 is set as the target number of elapsed days.

In the case where the pre-processor 17 acquires the adjustment coefficient corresponding to time of the date and time t of the target number of elapsed days from the adjustment coefficient determiner 16, the pre-processor 17 divides the demand result value of the date and time t by the acquired adjustment coefficient. That is, the demand result value of the date and time t is corrected.

As a specific example, if the date and time t is from 22:00 to 23:00 on Mar. 21, 2015, the number of elapsed days in the year is 80. Because the annual number of elapsed days of 80 is registered in the adjustment coefficient DB (see FIG. 6), 80 is the target number of elapsed days. Therefore, 0.67 corresponding to time from 22:00 to 23:00 of the target number of elapsed days is acquired as the adjustment coefficient. Then, the pre-processor 17 divides (corrects) the demand result value from 22:00 to 23:00 on Mar. 21, 2015 by the acquired adjustment coefficient of 0.67. Because 0.67 is smaller than 1, a division result becomes greater than the demand result value.

As another example, it is assumed that the date and time t is from 22:00 to 23:00 on Mar. 21, 2016. Because 2016 is a leap year, the number of elapsed days in the year is 81. The number of elapsed days closest before 81 is 80, and the number of elapsed days in the year closest after 81 is 119. Therefore, the number of elapsed days closest to the number of elapsed days of 81 is 80. 80 becomes the target number of elapsed days. Therefore, in a similar manner to the above-described example, the adjustment coefficient of 0.67 corresponding to 22:00 to 23:00 of the number of elapsed days of 80 in the year is acquired.

FIG. 9 schematically illustrates the pre-processing in which the demand result value (electric power supply result) at each time on the particular date is corrected, and the demand result value on the non-particular date is not corrected. Because May 3, 2015 is not the particular date, the demand result value at each time is not adjusted and output as is. Because May 4, 2015 is the particular date, the adjustment coefficient is acquired from the adjustment coefficient determiner 16 for each time, and the demand result value at each time is divided by the acquired adjustment coefficient.

Figure 10:
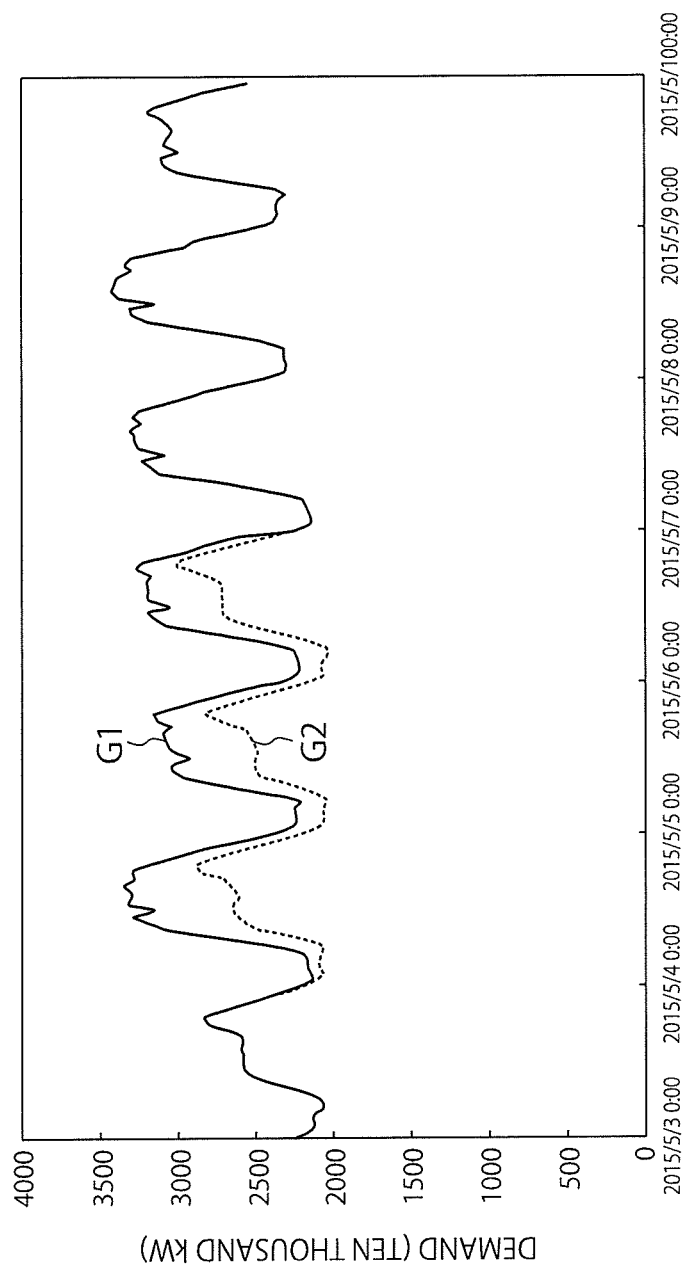
FIG. 10 is a diagram illustrating an example indicating a result of pre-processing on the demand result value in a graph.

FIG. 10 illustrates an example in which the pre-processing is performed on the demand result value at each time on each date, by in a graph for a period from May 3, 2015 to May 9, 2015. A graph G1 is a graph of the result of the pre-processing for a period from May 3, 2015 to May 9, 2015. A graph G2 is a graph indicating the demand result value before the pre-processing for three days from May 3, 2015 to May 6, 2015 which are particular dates (in this example, holidays other than weekends) as a comparison target. In these three days, as can be seen from comparison between the graph G1 and the graph G2, the demand result value is increased (expanded) by the pre-processing. In this way, by performing pre-processing, it is possible to regard data in a period from May 3, 2015 to May 9, 2015 as if the data were normalized to data not including holidays other than Saturday and Sunday.

The model learner 18 learns a demand prediction model for predicting a demand on a date and time in the future on the basis of the demand result data subjected to the pre-processing and the weather prediction data stored in the weather prediction DB 13. The demand prediction model is configured with a function. Learning of the demand prediction model means to identify a parameter of the function indicating the demand prediction model. Learning of the demand prediction model will be described in detail below.

The demand prediction model is generated for each time (time frame) of one day. For example, in the case where a demand of one day is expressed with numerical values of 24 time frames, because 24 one-hour time frames exist, 24 demand prediction models are created. Examples of the demand prediction model can include a regression model such as a multilinear regression model and an artificial neural network regression model. The demand prediction model can be expressed with the following function f as an example.

[Expression 3]

$$h_t \sim f(t, w_t, h_{t-p}, h_{t-p-1}, \ldots | \theta) = f(t, X_{t-p} | \theta) \quad (5)$$

A variable $h_t$ is a variable (target variable) indicating a demand on a date and time t in the future. A variable $h_{t-p}$ is a variable (explanatory variable) indicating a demand at the same time on a date p days before the date and time t, $h_{t-p-1}$ is a variable (explanatory variable) indicating a demand at the same time on a date p-1 days before the date and time t, and $h_{t-p-2}$ is a variable (explanatory variable) indicating a demand at the same time on a date p-2 days before the date and time t. A date p days before the date and time t corresponds to a current date and time as an example. Furthermore,

[Expressions 4]

$$h_t = g^{-1}(y_t)$$

(see expression (4)). That is, if the date and time t-p, t-p-1, t-p-2, ... are particular dates, $h_{t-p}$, $h_{t-p-1}$, $h_{t-p-2}$ indicate the demands divided by the adjustment coefficients. If the date and time t-p, t-p-1, t-p-2, ... are not particular dates, the demand $y_t$ is $h_{t-p}$, $h_{t-p-1}$, $h_{t-p-2}$, ... as is.

$w_t$ is a weather predicted value regarding the date and time t.

$X_{t-p}$ indicates a set of explanatory variables and

[Expression 5]

$$X_{t-p} = (w_t, h_{t-p}, H_{t-p-1}, \ldots)$$

θ is a parameter of a model, and a coefficient of each explanatory variable or a constant coefficient corresponds to the parameter.

In the prediction with the demand prediction model, when the date and time t is the date and time in the future, a demand $h_t$ on a date p days later from a current date and time t-p is predicted. That is, this demand prediction model indicates a regression expression which associates an explanatory variable $X_{t-p}$ being able to be used at a current time point with the demand $h_t$ on the date and time in the future which corresponds to a target variable.

The parameter θ is calculated so as to minimize a difference between a value calculated from the explanatory variable and the parameter θ using the function of the model and the demand result value (target variable). The difference is a model error. As an example, by solving the following minimization problem using the demand result data and the weather prediction data as learning data, it is possible to obtain the parameter θ. That is, the parameter θ is obtained by minimizing or making smaller the target function in expression (6).

[Expression 6]

$$\min_\theta \left\{ \sum_t |h_t - f(t, X_{t-p} | \theta)|^2 \right\} \quad (6)$$

Note that, there is a case where over-fitting occurs if the number of parameters θ is large. The over-fitting is excessive optimization of the parameter for the learning data. If over-fitting occurs, there is a problem that prediction accuracy of a model for data other than the learning data lowers. To avoid over-fitting, it is also possible to solve the minimization problem in which a penalty term (normalization term) for preventing increase in the number of parameters θ is provided. An example of the target function in which the penalty term is provided is indicated below. The parameter θ is obtained by minimizing or making smaller the target function. As a result of existence of the penalty term, the number of parameters which become zero increases, resulting in that it is possible to obtain an effect of reducing the number of parameters of the model.

[Expression 7]

$$\min_\theta \{\Sigma_t |h_t - f(t, X_{t-p} | \theta)|^2 + \lambda \Sigma_j |\theta_j|\} \quad (7)$$

For example, in the case where the demand prediction model is the multilinear regression model, it is possible to use a function as indicated below as a model function.

[Expression 8]

$$f(t, X_{t-p} | \theta) \equiv \sum_n \alpha_n e^{-2\pi i n \left(\frac{DoY_t}{365}\right)} + \sum_n \beta_n e^{-2\pi i n \left(\frac{DoW_t}{7}\right)} + \sum_n \gamma_n (w_t)^n + \sum_n \delta_n y_{t-n} \quad (8)$$

This function includes a parameter (regression coefficient),

[Expression 9]

$$\theta \equiv (\alpha_1, \ldots, \alpha_A, \beta_1, \ldots, \beta_B, \gamma_0, \ldots, \gamma_C, \delta_p, \ldots, \delta_{p+D})$$

$DoY_t$ is a periodic variable indicating the number of elapsed days in the year, and takes one of 1, 2, ..., 365 in accordance with the date and time t. $DoW_t$ is a periodic variable indicating the number of elapsed days within the week, and takes one of 1, 2, ..., 7 in accordance with the date and time t. Furthermore, while two left terms among four terms in a right side in expression (8) respectively include a real number portion and an imaginary number portion, only the real number portion is used.

A, B, C and D included in respective indexes of α, β, γ and δ in the above-described parameter θ are hyper parameters. The hyper parameter is the number of dimensions of the parameter (the number of parameters). Typically, in the case where machine learning is used, the user designates the number of dimensions before numerical values of the respective parameters are learned. Because whether a learning result is favorable or not depends on the number of dimensions, the number of dimensions is regarded as a parameter which is referred to as a hyper parameter.

A and B are orders of harmonic components regarding a trigonometric function. It is possible to express a periodic function using a trigonometric function in a similar manner to Fourier series expansion. The orders A and B at this time become hyper parameters. If the order is smaller, a smoother function is learned. If the order is greater, a function which largely fluctuates is learned. As an example, A and B are values within a range from 5 to 10. C is, for example, 2 if the weather predicted value $w_t$ is a temperature (° C.). D corresponds to the number of past days for which the demand result value is to be used, and D is a value within a range from 3 to 7 as an example. However, D may be equal to or greater than 1. That is, the number of days for which the demand result value is to be used may be equal to or greater than 1.

The model learner 18 stores the parameter of the model calculated by solving the minimization problem in the parameter DB 19.

The parameter DB 19 stores therein a parameter corresponding to each time (time frame) calculated by the model learner 18. The parameter DB 19 may further store a type of a function of the demand prediction model. The function can be configured with the type and the parameter.

FIG. 11 illustrates an example of the parameters stored in the parameter DB 19. The parameter of the model is stored for each time (time frame) obtained by dividing one day into 24 time frames. While, in the drawing, the parameters are expressed with symbols, actually, numerical values are given. An index (0 to 23) of θ and "x" (0 to 23) of "_x" of the index of each parameter correspond to an identifier at each time. For example,

[Expression 10]

$$\theta_7 \equiv \alpha_{1\_7}, \ldots, \alpha_{A\_7}, \beta_{1\_7}, \ldots, \beta_{B\_7}, \gamma_{0\_7}, \ldots, \gamma_{C\_7},$$
$$\delta_{P\_7}, \ldots, \delta_{P+D\_7}$$

is a parameter corresponding to 7:00 to 8:00.

Prediction Phase

The predictor 20 acquires a prediction instruction of a demand on the date and time (date and time of the prediction target) t in the future from the input device 201 or the communication device 401. If the predictor 20 acquires the prediction instruction, the predictor 20 reads out a parameter $\theta_t$ corresponding to time of the date and time t from the model parameter DB 19. Furthermore, the predictor 20 reads out the weather predicted value $w_t$ on the date and time t from the weather prediction DB 13.

Furthermore, the predictor 20 instructs the pre-processor 17 to read out the demand result value which corresponds to an explanatory variable of the model. The pre-processor 17 reads out the demand result values at the same time (the same time as time of the date and time t) corresponding to the number of days depending on the number of explanatory variables from the demand result DB 11. For example, in the case where the demand result values from a date six days before to the current date and time are used, the demand result values on the current date and time (date and time p days before the date and time of the prediction target) t-p, date and time t-p-1 one day before the current date and time, date and time t-p-2 two days before the current date and time, . . . , date and time t-p-6 six days before the current date and time are read out.

The pre-processor 17 determines whether or not the readout date of each date and time is the particular date on the basis of the calendar DB 12. The demand result value of the date which does not correspond to the particular date is transmitted to the predictor 20 as is without any processing being performed.

Concerning the date and time corresponding to the particular date, the pre-processor 17 transmits information on that date and time to the adjustment coefficient determiner 16. The adjustment coefficient determiner 16 calculates the number of elapsed days in the year of the date of the date and time. The adjustment coefficient determiner 16 specifies the number of elapsed days in the year (the target number of elapsed days) closest to the calculated number of days from the adjustment coefficient DB 15 and reads out the adjustment coefficient corresponding to time of the date and time of the specified target number of elapsed days. The adjustment coefficient determiner 16 transmits the readout adjustment coefficient to the pre-processor 17. The pre-processor 17 divides the demand result value on the date and time corresponding to the above-described particular date by the adjustment coefficient (see expression (4)) to thereby correct the demand result value. The pre-processor 17 transmits the corrected demand result value to the predictor 20.

The predictor 20 acquires the demand result value corresponding to the explanatory variable of the model, which is output from the pre-processor 17 as described above. The demand result value on the date and time of the date corresponding to the particular date has been corrected with the adjustment coefficient. A demand predicted value on the date and time t is calculated (the demand is predicted) by a function of the model (see expression (5) or expression (8)) on the basis of the demand result value corresponding to each explanatory variable acquired from the pre-processor 17, the parameter $\theta_t$ corresponding to the time of the date and time t and the weather predicted value $w_t$ on the date and time t. If the demand predicted value is set as $\hat{h}_t$, the demand predicted value can be calculated using the following expression on the basis of expression (5) indicated above.

[Expression 11]

$$\hat{h}_t = f(t, w_t, h_{t-p}, h_{t-p-1}, \ldots | \theta) \quad (9)$$

The post-processor 21 acquires the demand predicted value $\hat{h}_t$ on the date and time t from the predictor 20. The post-processor 21 performs post-processing on the demand predicted value $\hat{h}_t$.

Specifically, the post-processor 21 determines whether or not the date of the date and time t is the particular date. The determination is performed on the basis of the calendar DB 12 as an example. In the case where the date is not the particular date, the demand predicted value $\hat{h}_t$ is stored in the demand prediction DB 22 as a prediction result in association with the date and time t.

Meanwhile, in the case where the date is the particular date, an acquisition request for the adjustment coefficient corresponding to the date and time t is transmitted to the adjustment coefficient determiner 16. The adjustment coefficient determiner 16 calculates the number of elapsed days in the year of the date of the date and time t and specifies the number of elapsed days in the year (the target number of elapsed days) closest to the calculated number of days in the adjustment coefficient DB 15. The adjustment coefficient determiner 16 acquires the adjustment coefficient corresponding to time of the date and time t and transmits the acquired adjustment coefficient to the post-processor 21.

The post-processor 21 multiplies the demand predicted value $\hat{h}_t$ by the adjustment coefficient. That is, the demand predicted value $\hat{h}_t$ is inversely corrected with the adjustment coefficient. That is, for the demand result value which becomes the explanatory variable of the model, as described before, correction is performed by dividing the demand result value by the adjustment coefficient. On the other hand, inverse correction is performed by multiplying the demand predicted value by the adjustment coefficient. A result of the inverse correction is set as the demand predicted value. In this way, in order to cancel out influence of processing (correction) in which the demand on the particular date is increased to a demand at a level of weekdays in the pre-processing, inverse correction of reducing the demand is performed.

The post-processor 21 stores the inversely corrected demand predicted value in the demand prediction DB 22 in association with the date and time t.

In this manner, the post-processor 21 multiplies (inversely corrects) the demand predicted value $\hat{h}_t$ by the adjustment coefficient in the case where the date of the date and time t is the particular date and output the result as the post-processing, and, in the case where the date is not the particular date, the post-processor 21 outputs the demand predicted value $\hat{h}_t$ as is. This post-processing will be indicated with the following expression using the function g of expression (3).

[Expression 12]

$$\hat{h} = g(f(t, w_p, s_{t-p}, s_{t-p-1}, \ldots | \theta)) \quad (10)$$

The demand prediction DB 22 stores therein the demand predicted value on the date and time t calculated by the post-processor 21.

FIG. 12 illustrates an example of the demand predicted value (predicted electric power supply amount) stored in the demand prediction DB 22. In this example, an example is illustrated where the date of the prediction target is set as Dec. 23, 2015, and the demand predicted value is calculated for each time of 0:00 to 1:00, 1:00 to 2:00, 2:00 to 3:00, . . . , 23:00 to 24:00 obtained by dividing this date into 24 time frames. Dec. 23, 2015 is a holiday and set as the particular date. Therefore, the demand predicted value of each time is a value inversely corrected with the adjustment coefficient corresponding to each time at the post-processor 21. While the demand predicted value corresponding to one day is stored here, it is also possible to predict the demand of consecutive days such as, for example, one week and store the demand predicted value corresponding to a plurality of days in the demand prediction DB 22.

The output device 301 reads out data on the demand predicted value stored in the demand prediction DB 22 and displays the readout data on a screen. By this means, the user can confirm transition of the demand predicted value on the prediction date and time t. The output device 301 may display transition of the demand predicted value with a graph. By this means, the user can easily recognize transition of the demand predicted value.

Figure 13:
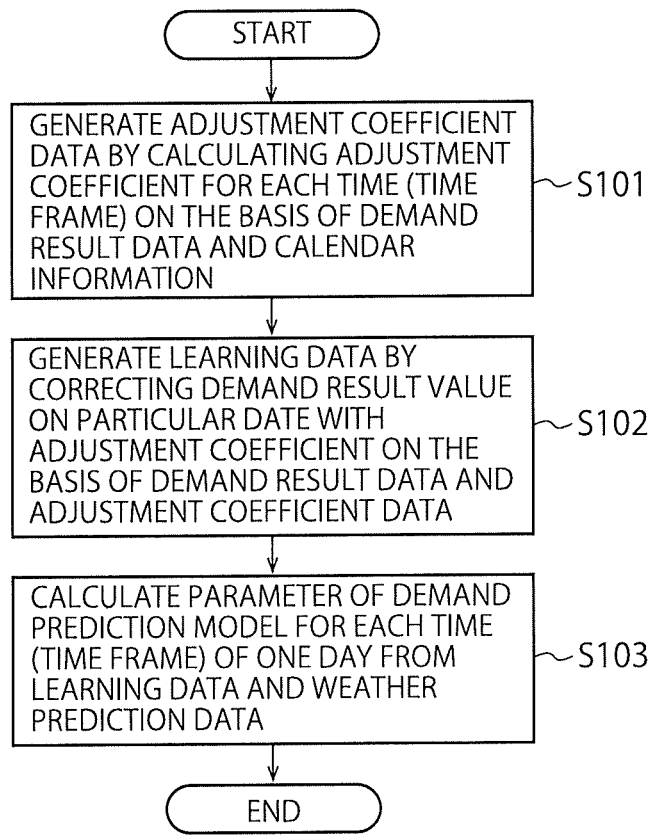
FIG. 13 is a flowchart illustrating an example of operation of a learning phase of the prediction device in FIG. 1.

FIG. 13 is a flowchart of the operation of the learning phase according to the present embodiment. The learning phase is performed in the case where a learning instruction is input from the user via the input device 201 as an example. Conditions of learning (such as a period of the past demand result value to be used for learning and a type of the model to be used) are included in the learning instruction.

In step S101, the adjustment coefficient calculator 14 determines the particular date on the basis of the calendar information within the calendar DB 12. The adjustment coefficient calculator 14 calculates the adjustment coefficient for each time (time frame) for the determined each particular date on the basis of the demand result data within the demand result DB 11. The calculated adjustment coefficient is associated with the number of elapsed days in the year of the particular date and the time, and the associated data is set as the adjustment coefficient data. The adjustment coefficient calculator 14 stores the adjustment coefficient data in the adjustment coefficient DB 15.

In step S102, the pre-processor 17 reads out demand result data necessary for learning from the demand result DB 11 and divides (corrects) the demand result value of each time on the particular date by the adjustment coefficient. The adjustment coefficient to be used for correction is acquired from the adjustment coefficient determiner 16. The adjustment coefficient determiner 16 specifies the number of elapsed days in the year (the target number of elapsed days) closest to the particular date in the adjustment coefficient DB 15 and transmits the adjustment coefficient corresponding to the above-described each time of the target number of elapsed days to the pre-processor 17. The pre-processor 17 does not correct the demand result value on the date (non-particular date) other than the particular date. The pre-processor 17 transmits the demand result data in which the demand result value on the particular date is corrected, to the model learner 18 as the learning data.

In step S103, the model learner 18 calculates a parameter of the demand prediction model for each time (time frame) of one day on the basis of the learning data and the weather prediction data. The model learner 18 stores the calculated parameter of the demand prediction model in the model parameter DB 19.

Figure 14:
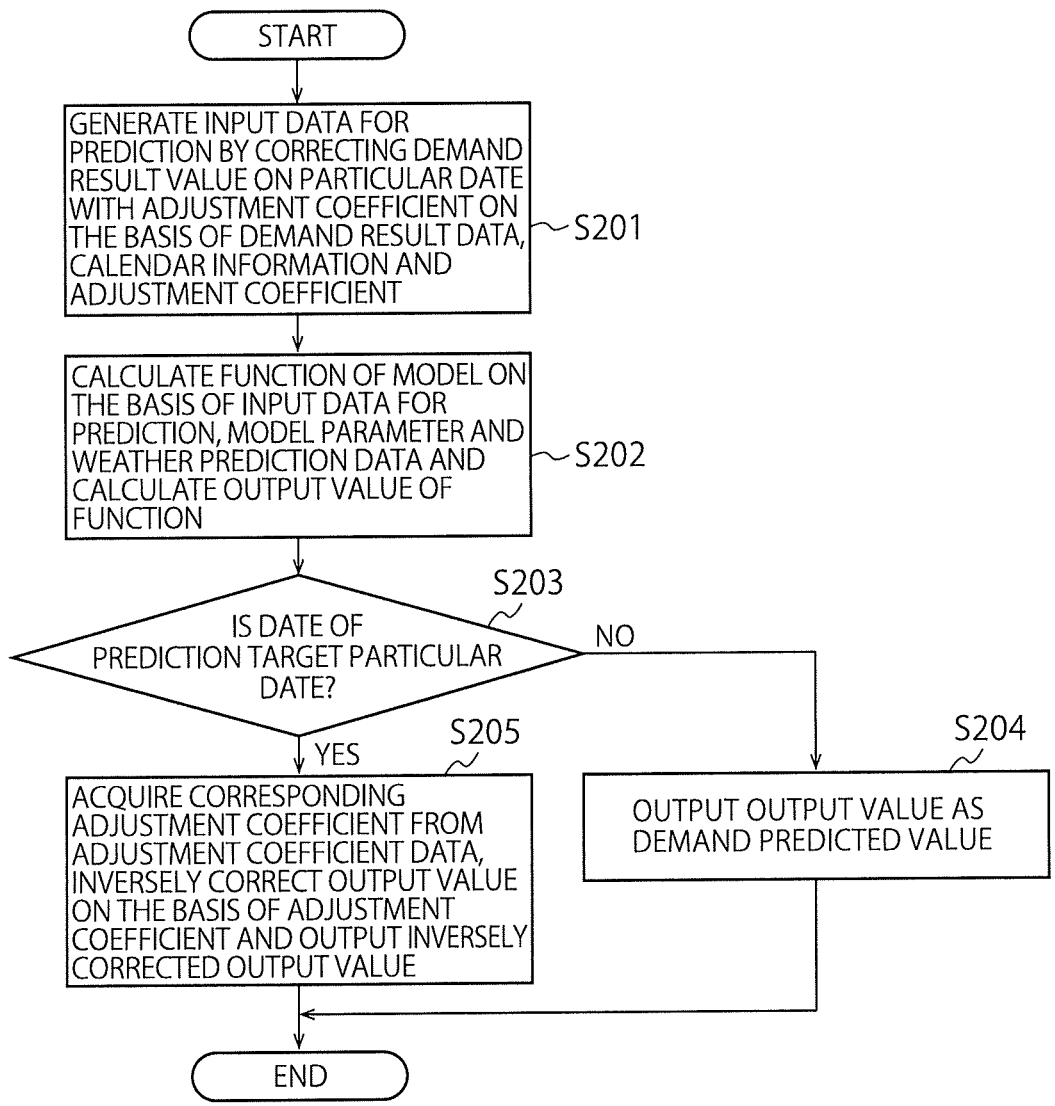
FIG. 14 is a flowchart illustrating an example of operation of a prediction phase of the prediction device in FIG. 1.

FIG. 14 is a flowchart of operation of the prediction phase according to the present embodiment. The prediction phase is started by an instruction designating a date of the prediction target being input from the user via the input device 201 as an example. Alternatively, the prediction phase may be started at a timing at which arbitrary conditions other than this are satisfied. Operation of the present flowchart is performed for each time (time frame) on the date of the prediction target.

In step S201, the pre-processor 17 reads out demand result data (data at the same time as the date and time of the prediction target) of a period for input to the explanatory variable of the demand prediction model from the demand result DB 11. The pre-processor 17 divides (corrects) the demand result value on the particular date in the readout demand result data by the adjustment coefficient. The adjustment coefficient to be used for correction is acquired from the adjustment coefficient determiner 16. The adjustment coefficient determiner 16 specifies the number of elapsed days in the year (target number of elapsed days) closest to the number of elapsed days in the year of the particular date in the adjustment coefficient DB 15 and acquires the adjustment coefficient of the above-described time among the adjustment coefficients corresponding to the target number of elapsed days. The acquired adjustment coefficient is transmitted to the pre-processor 17. The pre-processor 17 does not correct the demand result value on the date (non-particular date) other than the particular date. The pre-processor 17 transmits the demand result data in which the demand result value on the particular date is corrected, to the predictor 20 as input data for prediction.

In step S202, the predictor 20 reads out the weather predicted value for input to the explanatory variable of the demand prediction model from the weather prediction DB 13 and reads out a parameter corresponding to time of the date and time of the prediction target from the model parameter DB 19. The output value of the function (the demand prediction model) is calculated on the basis of the readout weather predicted value and parameter and the input data for prediction.

In step S203, the post-processor 21 determines whether or not the date of the prediction target is the particular date.

In step S204, in the case where the date of the prediction target is not the particular date (No), the output value calculated at the predictor 20 is output as is as the demand predicted value.

In the case where the date of the prediction target is the particular date in step S205 (Yes), the output value calculated at the predictor 20 is multiplied (inversely corrected) by the adjustment coefficient corresponding to the date and time of the prediction target, and the inversely corrected output value is output as the demand predicted value. The post-processor 21 acquires the adjustment coefficient to be used for inverse correction from the adjustment coefficient determiner 16. The adjustment coefficient determiner 16 acquires the adjustment coefficient in a similar manner to step S201, and sends the acquired adjustment coefficient to the post-processor 21.

As described above, according to the present embodiment, the adjustment coefficient for the particular date is calculated for each time from the past demand result data.

The demand result value for the particular date is corrected for each time with the adjustment coefficient, and the demand result value for the non-particular date is not corrected (pre-processing). In this manner, the demand result data in which the demand result value for the particular date is corrected is generated in the pre-processing. This is used as the learning data, and the demand prediction model is generated through machine learning. The demand predicted value (i.e., output value of the model) on the date and time in the future (i.e., date and time of the prediction target) is calculated from the most recent past demand result value using this prediction model. At this time, in the pre-processing before prediction, the demand result value on the particular date among the demand result values is corrected with the adjustment coefficient. In the post-processing after prediction, if the date of the date and time of the prediction target the particular date, the calculated demand predicted value is inversely corrected with the adjustment coefficient corresponding to the date and time.

In this manner, in the present embodiment, in the pre-processing, normalization processing of correcting the demand on the particular date to a demand at a level of the weekday is performed. Then, in the post-processing, processing (i.e., inverse correction) of reducing the demand is performed in order to cancel out influence of the normalization processing. By this means, it is possible to generate the demand prediction model common between the particular date and the non-particular date through machine learning and calculate the predicted value on the particular date with high accuracy using the model. Because it is not necessary to generate the demand prediction model dedicated for the particular date, the model can be easily managed.

Furthermore, in the present embodiment, the adjustment coefficient on the particular date is managed in association with the number of elapsed days in the year. Therefore, even if the date or the number of elapsed days in the year of the particular date is different for each year, by using the adjustment coefficient corresponding to the number of elapsed days in the year closest to the particular date, it is possible to easily specify the adjustment coefficient on the same particular date in different years. This utilizes characteristics that while the particular date somewhat varies, the number of elapsed days in the year is roughly close. By this means, because it is not necessary to manage the date and name of the particular date for each year, the implement can be easily made. Furthermore, load on the user who manages the calendar information is low, and cost is also low.

Modified Example 1

While, in the above-described embodiment, the demand result data, the weather prediction data, the adjustment coefficient data and the model parameter are generated for each time (time frame) obtained by dividing one day into a plurality of time frames, these kinds of data may be generated in unit of one day or in other unit of time. In this case, the demand prediction model may not be generated for each time but for each day or each other unit of time.

Modified Example 2

While, in the above-described embodiment, the weather predicted value is used for the explanatory variable of the demand prediction model, it is also possible to generate the demand prediction model without using the weather predicted value. In this case, it is not necessary to use the weather predicted value for prediction of the demand.

Hardware Configuration

Figure 15:
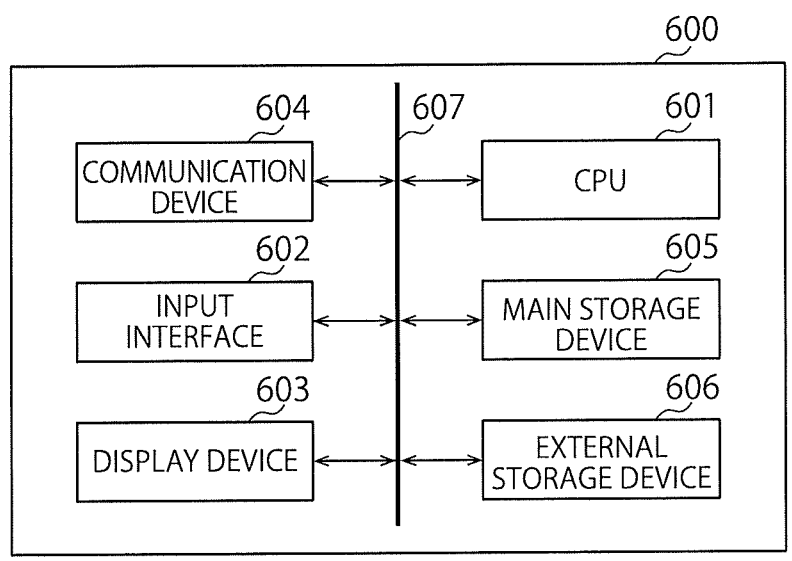
FIG. 15 is a diagram illustrating an example of a hardware configuration of the prediction device in FIG. 1.

FIG. 15 illustrates a hardware configuration of the prediction device 101 in FIG. 1. The prediction device 101 in FIG. 1 is configured with a computer device 600. The computer device 600 includes a CPU 601, an input interface 602, a display device 603, a communication device 604, a main storage device 605 and an external storage device 606, which are connected to each other with a bus 607.

The CPU (central processing unit) 601 executes a prediction program which is a computer program on the main storage device 605. The prediction program is a program which realizes the above-described respective functional components of the prediction device 101. The prediction program does not have to be one program, and may be realized with combination of a plurality of programs or scripts. Each functional component is realized by the CPU 601 executing the prediction program.

The input interface 602 is a circuit for inputting an operation signal from an input device such as a keyboard, a mouse and a touch panel to the prediction device 101. The input interface 602 corresponds to the input device 201.

The display device 603 displays data output from the prediction device 101. While the display device 603 is, for example, an LCD (Liquid Crystal Display), an organic electroluminescence display, a CRT (Cathode Ray Tube) or a PDP (Plasma Display Panel), the display device 603 is not limited to these. The data output from the computer device 600 can be displayed at this display device 603. The display device 603 corresponds to the output device 301.

The communication device 604 is a circuit for the prediction device 101 to perform communication with an external device in a wireless or wired manner. Data can be input from the external device via the communication device 604. The data input from the external device can be stored in the main storage device 605 or the external storage device 606.

The main storage device 605 stores the prediction program, data necessary for execution of the prediction program, data generated by execution of the prediction program, or the like. The prediction program is expanded on the main storage device 605 and executed. While the main storage device 605 is, for example, a RAM, a DRAM and an SRAM, the main storage device 605 is not limited to these. Each storage or database in FIG. 1 may be constructed on the main storage device 605.

The external storage device 606 stores the prediction program, data necessary for execution of the prediction program, data generated by execution of the prediction program, or the like. These prediction program and data are read out to the main storage device 605 upon execution of the prediction program. While the external storage device 606 is, for example, a hard disk, an optical disk, a flash memory, and a magnetic tape, the external storage device 606 is not limited to these. Each storage or database in FIG. 1 may be constructed on the external storage device 606.

Note that the prediction program may be installed in the computer device 600 in advance or may be stored in a storage medium such as a CD-ROM. Further, the prediction program may be uploaded on the Internet.

Further, the prediction device 101 may be configured with a single computer device 600 or may be configured as a system including a plurality of computer devices 600 which are connected to each other.

While certain approaches have been described, these approaches have been presented by way of example only, and are not intended to limit the scope of the inventions. Indeed, the apparatuses described herein may be embodied in a variety of other forms; furthermore various omissions, substitutions and changes in the form of the apparatuses described herein may be made. The accompanying claims and their equivalents are intended to cover such forms or modifications as would fall within the scope of the inventions.

The invention claimed is:

1. A prediction device comprising:
   a hardware storage configured to store demand result data including a plurality of demand result values on a plurality of dates and calendar data including information identifying whether the plurality of dates are particular dates or not, a date that is a particular date including a holiday, a non-particular date that is not the particular date including a weekday, the demand result values being result values of electric power supply amounts supplied in a supply area of an electric power company, and a number of dates with the non-particular date being greater than a number of dates with the particular date;
   adjustment coefficient calculation circuitry configured to:
     identify the particular dates based on the calendar data,
     calculate a number of elapsed days in a year, corresponding to each of the particular dates,
     calculate an adjustment coefficient for each of the particular dates based on the demand result data, and
     generate an adjustment coefficient database that maps the number of elapsed days in the year to the adjustment coefficient;
   adjustment coefficient determination circuitry configured to:
     receive a request to obtain an adjustment coefficient for a specified date,
     calculate a number of elapsed days in a year for the specified date,
     identify, in the adjustment coefficient database, a number of elapsed days closest to the calculated elapsed days,
     obtain from the adjustment coefficient database an adjustment coefficient corresponding to the identified elapsed days, and
     return the obtained adjustment coefficient to a source of the request;
   model learner circuitry configured to:
     judge whether each date in the demand result data is the particular date or not based on the calendar data, and if the date is the particular date, send a request to the adjustment coefficient determination circuitry to obtain the adjustment coefficient for the date,
     divide one of the demand result values on a date corresponding to the particular date among the plurality of dates by the obtained adjustment coefficient to acquire a first normalized demand result value, and
     generate, by machine learning, a prediction model for predicting a demand value on any date on a basis of the first normalized demand result value, which is received as learning data for the machine learning, on the date corresponding to the particular date and ones of the demand result values on dates corresponding to the non-particular date among the plurality of dates, the prediction model having input variables each assigned one of the first normalized demand result or one of the demand result values on one or more dates before the any date, having an output variable of a predicted demand value;
   input circuitry configured to receive information of a target date for demand prediction specified by a user; and
   predictor circuitry configured to:
     specify dates before the target date for demand prediction, wherein a number of the dates before the target date is identical to a number of the input variables in the prediction model,
     judge whether the specified date is the particular date or not, and if the specified date is the particular date, send a request to the adjustment coefficient determination circuitry to obtain the adjustment coefficient for the specified date,
     divide one of the demand result values on the date corresponding to the particular date among the demand result values of the specified dates by the obtained adjustment coefficient to acquire a second normalized demand result value,
     predict a demand value on the target date based on the prediction model in which the input variables are assigned the second normalized demand result value on the date corresponding to the particular date and the demand result values on the dates corresponding to the non-particular date among the specified dates,
     judge whether the target date is the particular date or not based on the calendar data, and if the target date is the particular date, send a request to the adjustment coefficient determination circuitry to obtain the adjustment coefficient for the target date, and
     multiply the predicted demand value by the obtained adjustment coefficient to acquire an inversely-normalized predicted demand value if the target date corresponds to the particular date, the inversely-normalized predicted demand value being a prediction demand value of the particular date, wherein
   the predicted demand value is a prediction demand value of the non-particular date if the target date corresponds to the non-particular date,
   the predicted demand value is a predicted value of the electric power supply amount,
   electric power supply on the target date to the supply area by the electric power company is controlled based on the predicted demand value on the target date, and
   the adjustment coefficient calculation circuitry is configured to:
     calculate a mean value of first ones of the demand result values and second ones of the demand result values for each of a plurality of particular dates,
       the first ones of the demand result values being demand result values on dates corresponding to the non-particular date among one or more dates before the date corresponding to each of the particular dates based on the demand result data, and
       the second ones of the demand result values being demand result values on dates corresponding to the non-particular date among one or more dates after the date corresponding to each of the particular dates; and
     calculate the adjustment coefficient for each of the particular dates based on a ratio between one of the demand result values on the date corresponding to each of the particular dates and the mean value.

2. The prediction device according to claim 1, wherein
the model learner circuitry is configured to generate the prediction model based on a weather predicted value on the date corresponding to the particular date and weather predicted values on dates corresponding to the non-particular date; and
the predictor circuitry is configured to predict the demand value on the target date based on the prediction model in which the input variables are further assigned weather predicted values on the dates before the target date.

3. The prediction device according to claim 1, wherein
the demand result data includes demand result values at a plurality of times in the plurality of dates,
the model learner circuitry is configured to divide one of the demand results value at a first time on the date corresponding to the particular date by an adjustment coefficient associated with the first time of the particular date to acquire the first normalized demand result value,
the model learner circuitry is configured to generate a prediction model for predicting a demand value at the first time on the target date on a basis of the first normalized demand result value at the first time on the date corresponding to the particular date and the demand result values at the first time on the dates corresponding to the non-particular date,
the predictor circuitry is configured to predict a predicted demand value at the first time on the target date based on the prediction model, the demand result values at the first time on the dates before the target date, and the adjustment coefficient associated with the first time of the particular date corresponding to at least one of the dates before the target date, and
the predictor circuitry is configured to multiply the predicted demand value by the adjustment coefficient associated with the first time of the particular date to acquire an inversely-normalized predicted demand value if the target date correspond to the particular date.

4. The prediction device according to claim 1, wherein the prediction model is a regression model.

5. The prediction device according to claim 1, further comprising:
an output device configured to display the inversely-normalized predicted demand value.

6. The prediction device according to claim 1, wherein a tendency of demand on the at least one particular date is different from tendencies of demand on the non-particular date.

7. The prediction device according to claim 1, wherein the holiday is a holiday other than Saturday and Sunday.

8. A prediction method comprising:
storing demand result data including a plurality of demand result values on a plurality of dates and calendar data including information identifying whether the plurality of dates are particular dates or not, a date that is a particular date including a holiday, a non-particular date that is not the particular date including a weekday, the demand result values being result values of electric power supply amounts supplied in a supply area of an electric power company, and a number of dates with the non-particular date being greater than a number of dates with the particular date;
identifying the particular dates based on the calendar data;
calculating a number of elapsed days in a year, corresponding to each of the particular dates;
calculating an adjustment coefficient for each of the particular dates based on the demand result data;
generating an adjustment coefficient database that maps the number of elapsed days in the year to the adjustment coefficient;
receiving by an adjustment coefficient determination circuitry a request to obtain an adjustment coefficient for a specified date;
calculating a number of elapsed days in a year for the specified date;
identifying, in the adjustment coefficient database, a number of elapsed days closest to the calculated elapsed days;
obtaining from the adjustment coefficient database an adjustment coefficient corresponding to the identified elapsed days;
returning the obtained adjustment coefficient to a source of the request;
judging whether each date in the demand result data is the particular date or not based on the calendar data, and if the date is the particular date, sending a request to the adjustment coefficient determination circuitry to obtain the adjustment coefficient for the date;
dividing one of the demand result values on a date corresponding to the particular date among the plurality of dates by the obtained adjustment coefficient to acquire a first normalized demand result value;
generating, by machine learning, a prediction model for predicting a demand value on any date on a basis of the first normalized demand result value, which is received as learning data for the machine learning, on the date corresponding to the particular date and ones of the demand result values on dates corresponding to the non-particular date among the plurality of dates, the prediction model having input variables each assigned one of the first normalized demand result or one of the demand result values on one or more dates before the any date, having an output variable of a predicted demand value;
receiving information of a target date for demand prediction specified by a user;
specifying dates before the target date for demand prediction, wherein a number of the dates before the target date is identical to a number of the input variables in the prediction model;
judging whether the specified date is the particular date or not, and if the specified date is the particular date, send a request to the adjustment coefficient determination circuitry to obtain the adjustment coefficient for the specified date;
dividing one of the demand result values on the date corresponding to the particular date among the demand result values of the specified dates by the obtained adjustment coefficient to acquire a second normalized demand result value;
predicting a demand value on the target date based on the prediction model in which the input variables are assigned the second normalized demand result value on the date corresponding to the particular date and the demand result values on the dates corresponding to the non-particular date among the specified dates;
judging whether the target date is the particular date or not based on the calendar data, and if the target date is the particular date, sending a request to the adjustment coefficient determination circuitry to obtain the adjustment coefficient for the target date; and multiplying the predicted demand value by the obtained adjustment coefficient to acquire an inversely-normalized predicted demand value if the target date corresponds to the particular date, the inversely-normalized predicted demand value being a prediction demand value of the particular date, wherein the predicted demand value is a prediction demand value of the non-particular date if the target date corresponds to the non-particular date, the predicted demand value is a predicted value of the electric power supply amount, electric power supply on the target date to the supply area of the electric power company is controlled based on the predicted demand value on the target date, and the method further comprises:

calculating a mean value of first ones of the demand result values and second ones of the demand result values for each of the particular dates based on the demand result data, the first ones of the demand result values being demand result values on dates corresponding to the non-particular date among one or more dates before the date corresponding to each of the particular dates, and the second ones of the demand result values being demand result values on dates corresponding to the non-particular date among one or more dates after the date corresponding to each of the particular dates; and calculating the adjustment coefficient for each of the particular dates based on a ratio between one of the demand result values on the date corresponding to each of the particular dates and the mean value.

9. A non-transitory computer readable medium having a computer program stored therein which causes a computer to perform processes comprising:

reading demand result data including a plurality of demand result values on a plurality of dates and calendar data including information identifying whether the plurality of dates are particular dates or not, a date that is a particular date including a holiday, a non-particular date that is not the particular date including a weekday, the demand result values being result values of electric power supply amounts supplied in a supply area of an electric power company, and a number of dates with the non-particular date being greater than a number of dates with the particular date;

identifying the particular dates based on the calendar data;

calculating a number of elapsed days in a year, corresponding to each of the particular dates;

calculating an adjustment coefficient for each of the particular dates based on the demand result data;

generating an adjustment coefficient database that maps the number of elapsed days in the year to the adjustment coefficient;

receiving by an adjustment coefficient determination circuitry a request to obtain an adjustment coefficient for a specified date;

calculating a number of elapsed days in a year for the specified date;

identifying, in the adjustment coefficient database, a number of elapsed days closest to the calculated elapsed days;

obtaining from the adjustment coefficient database an adjustment coefficient corresponding to the identified elapsed days;

returning the obtained adjustment coefficient to a source of the request;

judging whether each date in the demand result data is the particular date or not based on the calendar data, and if the date is the particular date, sending a request to the adjustment coefficient determination circuitry to obtain the adjustment coefficient for the date;

dividing one of the demand result values on a date corresponding to the particular date among the plurality of dates by the obtained adjustment coefficient to acquire a first normalized demand result value;

generating, by machine learning, a prediction model for predicting a demand value on any date on a basis of the first normalized demand result value, which is received as learning data for the machine learning, on the date corresponding to the particular date and ones of the demand result values on dates corresponding to the non-particular date among the plurality of dates, the prediction model having input variables each assigned one of the first normalized demand result or one of the demand result values on one or more dates before the any date, having an output variable of a predicted demand value;

receiving information of a target date for demand prediction specified by a user;

specifying dates before the target date for demand prediction, wherein a number of the dates before the target date is identical to a number of the input variables in the prediction model;

judging whether the specified date is the particular date or not, and if the specified date is the particular date, send a request to the adjustment coefficient determination circuitry to obtain the adjustment coefficient for the specified date;

dividing one of the demand result values on the date corresponding to the particular date among the demand result values of the specified dates by the obtained adjustment coefficient to acquire a second normalized demand result value;

predicting a demand value on the target date based on the prediction model in which the input variables are assigned the second normalized demand result value on the date corresponding to the particular date and the demand result values on the dates corresponding to the non-particular date among the specified dates;

judging whether the target date is the particular date or not based on the calendar data, and if the target date is the particular date, sending a request to the adjustment coefficient determination circuitry to obtain the adjustment coefficient for the target date; and multiplying the predicted demand value by the obtained adjustment coefficient to acquire an inversely-normalized predicted demand value if the target date corresponds to the particular date, the inversely-normalized predicted demand value being a prediction demand value of the particular date, wherein the predicted demand value is a prediction demand value of the non-particular date if the target date corresponds to the non-particular date, the predicted demand value is a predicted value of the electric power supply amount, electric power supply on the target date to the supply area of the electric power company is controlled based on the predicted demand value on the target date, and the processes further comprises:
- calculating a mean value of first ones of the demand result values and second ones of the demand result values for each the particular dates based on the demand result data,
  - the first ones of the demand result values being demand result values on dates corresponding to the non-particular date among one or more dates before the date corresponding to each of the particular dates, and
  - the second ones of the demand result values being demand result values on dates corresponding to the non-particular date among one or more dates after the date corresponding to each of the particular dates; and
- calculating the adjustment coefficient for each of the particular dates based on a ratio between one of the demand result values on the date corresponding to each of the particular dates and the mean value.

* * * * *